United States Patent [19]

Bays

[11] 4,363,507
[45] Dec. 14, 1982

[54] AUTO BODY PROTECTOR

[76] Inventor: Marvin J. Bays, P.O. Box 1104, Richardson, Tex. 75080

[21] Appl. No.: 199,960

[22] Filed: Oct. 23, 1980

[51] Int. Cl.³ ............... B60R 19/00; B60R 27/00; E04H 17/00
[52] U.S. Cl. .................................. 293/128; 40/591; 52/717; 280/770
[58] Field of Search ................... 293/21–23, 293/126–128; 40/591; 280/770; 52/717

[56] References Cited

U.S. PATENT DOCUMENTS 2,889,165  6/1959  Zientara .......................... 293/128
3,131,960  5/1964  Popp ............................... 280/770
3,782,766  1/1974  Teel ................................ 293/127

Primary Examiner—Richard A. Bertsch
Attorney, Agent, or Firm—Larry B. Dwight

[57] ABSTRACT

The invention briefly comprises apparatus for protecting the finish of a vehicle having a door along the side thereof comprising a wire rope detachably secured to the first end bumper on the vehicle and stretched through a center post trapped by the lip of the door between the opening in the door and spacing said wire rope from the side of the vehicle. A tensioning device is detachably secured to the second end of said wire rope to attach to the other bumper on the vehicle to form a rigid wire surface spaced from the vehicle to prevent objects from striking the vehicle.

3 Claims, 2 Drawing Figures

AUTO BODY PROTECTOR

DESCRIPTION

TECHNICAL FIELD

This invention relates to a detachable device for protecting the sides of automobiles from being dented or scratched by the doors of adjacent vehicles in a parking place.

With the cost of todays automobiles, it is highly desireable to protect the sides of the vehicles from damage which would depreciate the value of the vehicle. Heretofore, vinyl strips have been glued or screwed onto the side of the vehicle in an attempt to prevent doors from hitting the surface of the finish. This detracts from the beauty of the car and is ineffectual against heavy objects or odd shaped doors which may strike the surface of the body before striking the vinyl. Often a door may strike the side molding, yet have a sufficient impact to dint the auto body.

SUMMARY OF THE INVENTION

I have devised a device for attaching along the side of the vehicle to prevent objects such as car doors from striking the painted surface of the vehicle. The device is detachable when the car is in motion and may be secured thereon while the vehicle is parked.

The device generally comprises a center arm having an outwardly extending spacer member rigidly secured to a gripping member. The gripping member is formed from an angle iron covered with rubber and has a shoulder form which engages the lip of the door and is secured at the high point on the door as the door is closed. Thus the inside angle forms a pressure plate to hold the outwardly extending member as the shoulder is trapped by the lip of the door. A wire rope, preferably coated with vinyl so as to prevent any injury to a pedistrian, is detachably secured to the end of the bumper by means such as an eye bolt and is stretched through the outer end of outwardly extending member and detachably secured at the other end of the bumper by means of a toggle latch which tensions the wire rope. The tension on the wire rope forms a rigid member along the side of the vehicle which prevents objects from striking the side of the vehicle. Thus, the wire rope absorbs the kinetic energy of the adjacent car door and changes it to potential energy. It is spaced outwardly far enough to prevent odd shaped doors, and other objects from striking any portion of the body. The wire rope is flexible such that when it is removed the entire unit may be rolled up in a small compact package or pouch for storage.

A primary object of the invention is to protect the finish on the vehicle when said device is attached.

Another object of the invention is to provide a device which is detachably secured and easily attachable to a vehicle of all styles and body shapes which will protect a vehicle from being hit.

Other and further objects will become apparent upon studing the detailed description and drawings annexed hereto.

BRIEF DESCRIPTION OF THE DRAWINGS

Drawings of a preferred embodiment are attached hereto so that invention may be better and more fully understood, in which.

Numeral references are used to designate like parts throughout the various figures for the drawings.

DESCRIPTION OF THE INVENTION

Figure 1:
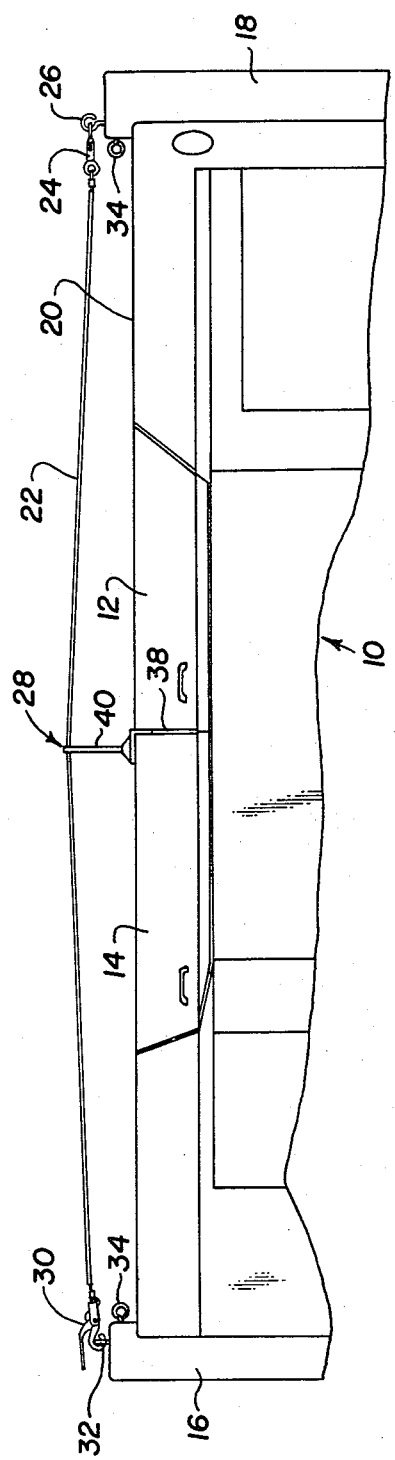
FIG. 1 is a diagramatic view showing the auto protector attached to a typical vehicle.

FIG. 1 of the drawings is a diagramatic view showing the upper end on one side of a typical vehicle 10 having at least one door 12 and possibly a rear door 14. The device also fits two door vehicles and can be attached to any point near the bumper whether on the bumper or on the front and rear quarter panels depending on the body style. The vehicle has a rear bumper 16 and a front bumper 18 having edges which extend outwardly from the sides 20 of the vehicle.

The auto protector generally comprises a wire rope 22 cut to the length of the vehicle and preferrably coated with vinyl to protect other vehicles and to prevent rust and protect the user.

A first end of the wire rope 22 is detachably secured to the end of a bumper 18 by means such as a round eye swivel bolt snap 24 detachably secured to an eye bolt 26 mounted in bumper 18. The wire rope 22 is secured by means such as crimping sleeves a rather standard means of attachment for fastening wire rope.

The wire rope 22 passes through a passage in the end of center post 28 and is detachably secured to the bumper 16 by means such as a toggle latch 30 fastened to an eye bolt 32 to secured in bumper 16. The latch 30 and snap 24 may be attached at either end of the auto 10. The toggle latch 30 or load binder as it is sometimes called, stretches the wire rope 22 to pull all slack therefrom and maintain tension on the wire rope so that it acts as a rigid member. Therefore, under tension, the wire rope 22 becomes a rigid member which doesn't give if an object strikes it. An optional location for the eye bolts attached to bumpers 16 and 18 are shown by eye bolts 34 and the eye bolts may be mounted at various angles and locations depending on the body style.

A center post 28 (FIG. 2) is secured under the lip 36 of door 12 in the space 38 between doors 12 and 14 or on a two door vehicle between door 12 and the center post.

Center post 28 generally comprises an outwardly extending rigid post member 40 having a passage 42 formed in the outer end to allow wire rope 22 to pass therethrough. The other end of post 40 is rigidly secured to a short piece of angle iron 44 by welding or other means. A rubber cover 46 is formed about the angle iron 44. The cover 46 forms a protective surface 48 and 50 to prevent scratching of the vehicle as the post is placed thereon. A shoulder 52 is formed by wedge 54 to catch the lip 36 of door 12. It should be readily apparent that upon placing the center post 28 in the space 38 between the two doors and closing door 12 that button 56 is forced against an interior surface of the door or vehicle and trapping surface 48 against the outer surface of door 14. The center post 28 is thus ridigly caught on the door and cannot be pulled therefrom. The post 40 spaces the wire rope preferrably a distance of at least six and one-half inches from the high point of the body side. A maximum distance is probably about eight inches, depending on the body style and rear and front bumper sizes. Thus the wire rope 22 is tensioned preventing the vehicle doors or other objects from striking through the rope to hit the vehicle finish. The device may be removed while not in the parking position and prevents the necessity of placing vinyl strips on the side of the vehicle.

Figures 2, 3:
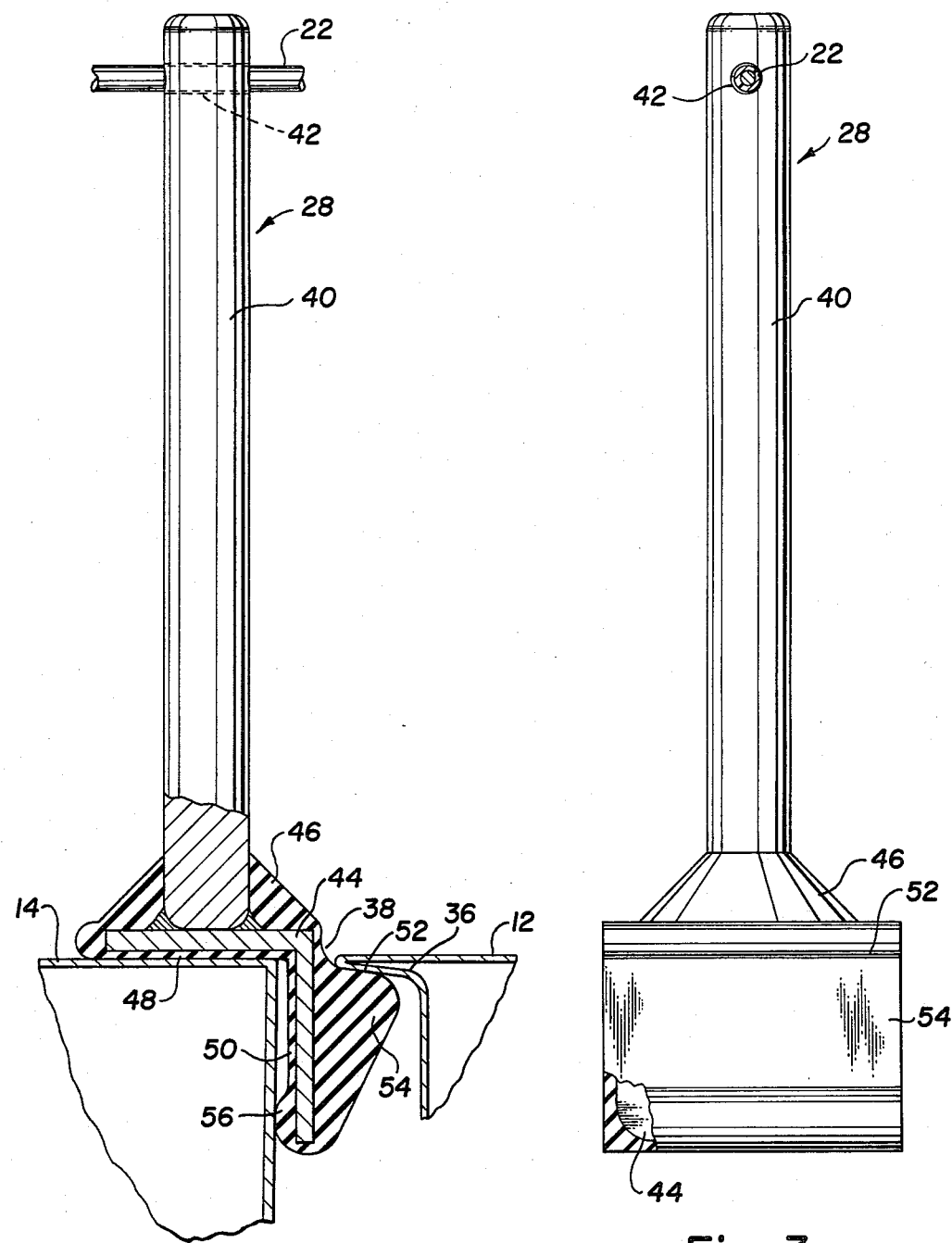
FIG. 2 is an enlarged view of the center post with parts broken away to more clearly illustrate the details of construction.
FIG. 3 is an elevational view of the center post.

It has been found that the rubber cover 46 should be constructed of rubber preferrably in the 30 to 60 durometer range, with 50 durometer giving the best results. This permits a rubber which is not too soft to pull out or to hard to damage the surface of the vehicle. All edges of the angle iron are preferrably rounded, as illustrated in FIG. 3, to prevent sharp corners. It should be appreciated that center post 28 may be constructed of other materials such as aluminum or possibly some plastics.

All parts should be coated with a rust preventive material since the parked vehicle will often be in the weather.

A lock may be used to secured the toggle latch 30 to the vehicle to prevent unauthorized removal and act as a deterrant to theft of the vehicle since the door could not be opened until removal of the latch 30.

It should be apparent from the foregoing that the invention accomplishes the objects of the invention herebefore described and that other and further objects of the invention may be advised without departing from the basic concept thereof.

I claim:

1. Apparatus for protecting the finish of the side of a vehicle having a door along the side of said vehicle comprising: a wire rope; means detachably securing first end of said wire rope to an end of the vehicle; tensioning means detachably securing a second end of said wire rope to the other end of the vehicle said tensioning means adapted to pull the wire rope tight when secured to the vehicle; a center post having an outwardly extending post member rigidly secured to an angle member; a rubber cover formed about said angle member forming a shoulder adjacent to said angle member and a protective surface on the inside of said angle member such that the shoulder is engaged by said door when closed trapping the cover and the angle between the door and the door opening such that the post member extends outwardly from the vehicle, the center post member having a passage formed through in the outer end through which the wire rope passes to space the wire rope from the side of said rope.

2. Apparatus according to claim 1 wherein said wire rope has a vinyl coating formed thereon.

3. Apparatus according to claim 1 wherein said tensioning means for detachably securing said wire rope comprises a toggle latch which pulls the wire rope tight as it is closed.

* * * * *